Aug. 19, 1958   G. F. PAPPAS   2,848,280
METHOD AND APPARATUS FOR HANDLING FINELY DIVIDED SOLIDS
Filed Sept. 15, 1953   2 Sheets-Sheet 1

George F. Pappas   Inventor
By George J. Silhavy   Attorney

Aug. 19, 1958  G. F. PAPPAS  2,848,280
METHOD AND APPARATUS FOR HANDLING FINELY DIVIDED SOLIDS
Filed Sept. 15, 1953  2 Sheets-Sheet 2

George F. Pappas  Inventor
By George J. Silhavy  Attorney

United States Patent Office 2,848,280
Patented Aug. 19, 1958

2,848,280

METHOD AND APPARATUS FOR HANDLING FINELY DIVIDED SOLIDS

George F. Pappas, Westfield, N. J., assignor to Esso Research and Engineering Company, a corporation of Delaware Application September 15, 1953, Serial No. 380,321

9 Claims. (Cl. 302—53)

This invention relates to transferring divided solids from one vessel to another vessel or through pipes or tubes from one zone of a vessel to another zone thereof. More particularly the present invention relates to controlling the flow of small divided solids between a reactor and a regenerator or burner, and for insuring flow of the solids through transfer lines and diplegs associated with cyclone separators or the like. This invention has particular application in instances where the particle size is either too coarse or too fine so that flow around bends is difficult to maintain. It can also be applied to some advantage in cases where no such difficulty is experienced.

In fluid solids systems such as fluid catalyst reactors and regenerators, the cyclone separators or other dust-gas separators are usually housed inside of the reactor and regenerator. The separated solids or fines collected in the cyclone separator pass down into a dipleg for returning the separated solids to the fluid bed in the reactor and regenerator. The separation of solids by the cyclone separators in series is selective as to size, that is, the coarsest particles are removed in the first stage of cyclone separators, finer particles in the secondary stage of separators and finest in the tertiary stage of separators. The finer particles collected in the diplegs from the secondary and tertiary stages require more height of dipleg to build up the same pressure as is built up by a shorter dipleg of coarser particles. It is necessary to build up sufficient pressure or hydraulic seal in the dipleg to return the solids from the dipleg to the fluid bed in the vessel. The hydraulic seal is also necessary to prevent reverse flow of vapors or gases up the cyclone dipleg. The present invention permits utilization of vessel elevation or bed depth in meeting cyclone dipleg seal requirements by returning the catalyst to the bed via a U-shaped dipleg, the riser or discharge side of which is aerated to a low density.

The required height of the vessel above the top of the fluid bed is fixed by the head required to return fines to the fluid bed from the secondary and/or tertiary stages of cyclone separators. In some instances, particularly fluid hydroformer vessels, the required seal can amount to as much as forty feet. The present invention permits this to be reduced to as little as ten feet. At the same time the present invention provides a seal against transient pressure fluctuation and it prevents overaeration of the dipleg from the bed, while it provides a receptacle at the bottom to guard against plugging of the riser with pieces of lining, etc. Use of the present invention for these reasons alone, aside from any saving in vessel height, would also be warranted.

According to the present invention a U-shaped dipleg is provided which extends to near the bottom of the vessel and returns to near the surface of the fluid bed of solids in the vessel. The return line or riser preferably has a top reverse U-bend or 180° bend for directing the flow of solids downwardly. The dipleg at its lower portion is preferably provided with an aerated lift pot for insuring flow of solids in the dipleg. The lift pot insures flow of the solids around U-bends where the direction of flow is changed. Another advantage for the lift pot is that it provides a seal against reverse flow of vapor or gas up the dipleg. The lift pot also serves as a receptacle to guard against plugging the riser with pieces of the vessel lining, especially in cases where the riser has a smaller diameter than the dipleg. The top of the dipleg riser may be arranged above or below the level of the fluidized solids bed in the vessel and if below the reverse U-bend at the top of the riser may be omitted. With the present invention the vessel height required in cracking or hydroforming is materially reduced. The dipleg is also useful in starting up a fluid unit as it prevents flow of gas through the dipleg of the cyclone separator before a sealing fluid bed is provided in the vessel.

The aerated lift pot is also useful in fluid units for controlling flow of solids without the use of slide valves or like mechanical means. Under certain conditions systems using U-shaped conduits for flow control means may run into difficulty because of the horizontal bottom section of the U-shaped conduits. The present invention is an improvement on this system and insures good operation at all times. The lift pot in this service also provides seal against flow reversals and thus makes it possible in some instances to reduce vessel elevation from that required with U-shaped conduits by 5–10′.

In the drawings:

Fig. 2 represents a detail showing the aerated pot for use with diplegs or the like.

Figure 1:
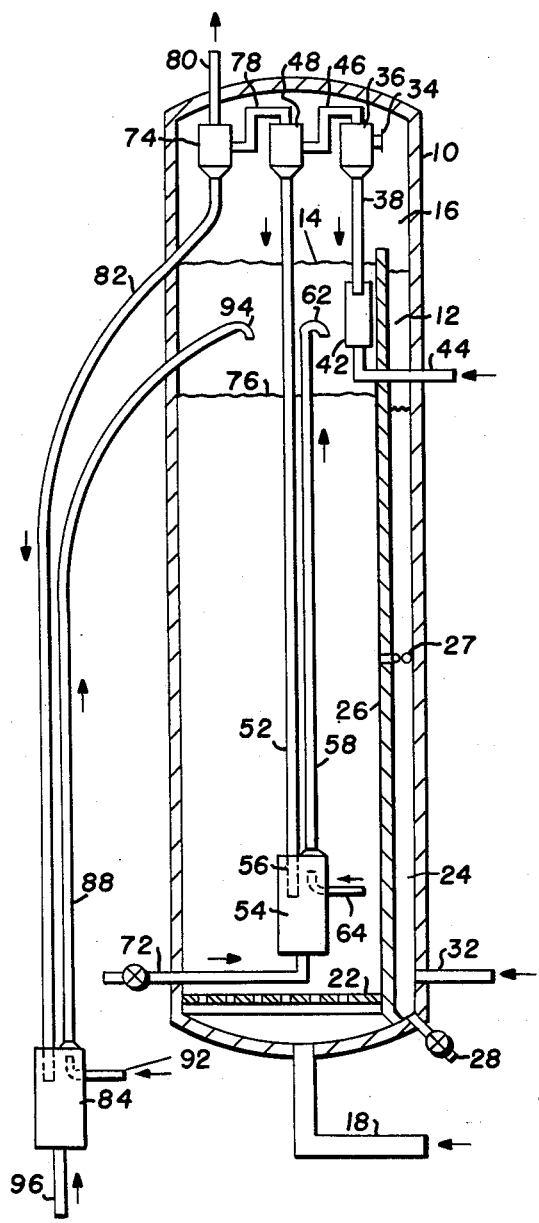
Fig. 1 represents a vertical cross-section of one form of the invention applied to the dipleg of cyclones in a vessel.

Referring now to Fig. 1 of the drawing, the reference character 10 designates an elongated cylindrical vessel which may be a reactor, a regenerator or a contacting vessel in general where finely divided solids are maintained as a dense turbulent fluidized bed 12 having a level generally indicated at 14 with a dilute phase 16 thereabove. The gasiform material and in some cases finely divided solids and gasiform material are passed through line 18 into the bottom portion of vessel 10 below distributing grid 22. In catalytic cracking of hydrocarbons, a relatively heavy oil such as gas oil and cracking catalyst such as silica-alumina catalyst are passed through line 18 and the catalyst bed 12 in reactor 10 is maintained at a cracking temperature within the range of about 850° F. to 1000° F. to produce motor fuel such as gasoline and other desirable products. During regeneration with air the temperature in the regenerator is between about 900° and 1200° F.

The cracking catalyst or other solid is of a size between about 200 and 400 standard mesh or finer and preferably includes particles of different sizes ranging between about 0 and 150 microns with the major portion of the particles being between about 20 and 100 microns.

The superficial velocity of the vapors and gases passing upwardly through fluid bed 12 is between about 0.5 and 3.0 feet per second and when using a silica-alumina cracking catalyst, the density of the dense fluid bed 12 will be between about 25 and 35 lbs. per cu. ft. In a hydroforming operation the pressure in vessel 10 is between about 150 and 250 lbs. p. s. i. g., and using an alumina-molybdenum oxide catalyst of substantially the same particle size as above described for catalytic cracking and using a superficial velocity between about 0.4 and 1.5 ft./sec., the density of the fluid bed 12 will be between about 25 and 35 lbs./cu. ft. In hydroforming the temperature is between about 850 and 950° F. and during regeneration with air the temperature in the regeneration zone is between about 1000 and 1200° F.

When using vessel 10 as a regenerator, air is introduced into the bottom of vessel 10 below grid 22 through line 18. Instead of introducing gasiform material and finely divided solids together through line 18, the gasiform material is introduced via line 18 and the solids introduced into the fluid bed 12 through a separate line (not shown).

Spent or regenerated catalyst or solids are withdrawn from the dense bed 12 into a reservoir 24 formed by a vertical baffle 26 spaced from the inner wall of vessel 10 and extending above the normal level 14 of fluid bed 12. Baffle 26 is provided with restriction orifices 27 in a lower portion thereof to permit flow of catalyst from bed 12 to reservoir 24. Solids are withdrawn from reservoir 24 through line 28 which may be a standpipe for building up pressure for conducting the solids to the other vessel. Circulation of solids between vessels in fluid solids systems is well known and need not be described in further detail. Stripping gas such as steam may be introduced into the bottom portion of reservoir 24 through line 32 in a known manner to strip vaporizable material from the catalyst.

The finely divided solids passing upwardly through the vessel 10 form dense turbulent fluid bed 12 and the gasiform material passing up through the dilute phase 16 contain entrained particles which are substantially removed by passing the gasiform material through two or more stages of cyclone separators or other dust separating means. Each of the stages may comprise more than one cyclone separator provided with diplegs which converge into a larger common dipleg for each stage.

The gasiform material or vaporous reaction products containing entrained solids pass through inlet 34 of primary cyclone separation stage 36 for removal of a major portion of the entrained solids. The separated solids pass through dipleg 38 into seal pot 42 normally below level 14 of catalyst bed 12. Aerating or fluidizing gas is introduced into the bottom portion of seal pot 42 through line 44 to maintain the solids in a free flowing condition and so that the solids collecting in seal pot 42 from dipleg 38 will overflow pot 42 and be returned to fluid bed 12.

The gasiform material from which solids were separated in separation stage 36 pass through line 46 to a second cyclone separation stage 48 which may comprise more than one cyclone separator for separating additional solids from the gasiform material. The separated solids are passed to dipleg 52 which forms part of the present invention and which extends to near the bottom portion of vessel 10 above grid 22. The lower end of dipleg 52 extends into the top of a cylindrical vertically arranged lift pot 54 a short distance as shown at 56. If desired, a horizontally extending baffle plate may be provided in the pot 54 a short distance below the lower end of dipleg 52. Lift pot 54 in operation is full of solids. The distance between the bottom of return pipe 52 and the point of gas injection at 64 is one of the features of the present invention and provides seal against the flow of gas up dipleg 52 due to transient pressure fluctuations, as will be hereinafter described.

Figure 2:
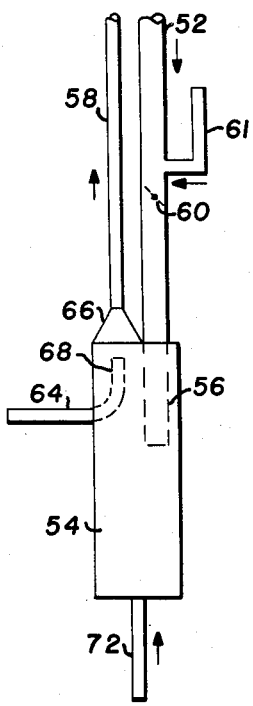

As shown in Fig. 2 dipleg 52 is arranged at one side of the pot 54 and on the other side of the pot 54 extending upwardly from the top is a riser 58 which communicates with the top of the pot 54. Dipleg 52 is provided with damper 60 to enable restoring normal flow in the event of a flow reversal. Aeration lead 61 may be provided for dipleg 52. The upper end of riser 58 is provided preferably with a 180° bend 62 at the upper portion of vessel 10 for returning the finer catalyst to the fluid bed 12. Lift gas is introduced into the lower portion of riser 58 through line 64. In another form (not shown) the riser 58 may be provided with a bend to extend outside vessel 10 and then return to about the outlet of bend 62 for returning fines to vessel 10. The external bend may be provided with a valve for external manipulation and in this case valve 60 may be omitted.

In Fig. 2 the top of pot 54 has an inverted cone section 66 which forms the lower end of riser 58 and lift gas line 64 has its inner portion 68 directed upwardly into the cone section 66. The solids in pot 54 are maintained in aerated condition by the introduction of an aerating gas into the bottom of the pot 54 through line 72. Inner portion 68 of pipe 64 can be made to act as an eductor to provide driving force for solids in addition to that gained by density differentials in legs 52 and 58.

The powdered material recovered in the secondary stage of cyclone separators is finer than that recovered in the primary stage and because it is finer it takes more of a column length to produce the same hydrostatic pressure as is produced by a shorter column of coarser particles. In addition there is a pressure drop and loss of pressure as the gasiform material goes from dilute phase 16, through secondary cyclone separation stage 48 and through tertiary cyclone separation stage 74, if one is used. This means that a longer column of fluidized solids is necessary in dipleg 52 than in primary dipleg 38 to build up sufficient hydrostatic pressure to return the separated solids to fluid bed 12 because there is a lower pressure at the top of the column in pipe 52 than there is at the top of the column in primary return pipe 38. Also the solids in return pipe 52 are finer than in return pipe 38 and as stated above less hydrostatic pressure per unit length is built up with finer solids than with coarse solids.

To get the additional height of column necessary to build up the hydrostatic pressure needed to return the separated solids would necessitate building a taller vessel to mount the cyclone separators higher while maintaining a bigger or deeper dilute phase 16 than shown in Fig. 1. That is, for the same quantity of catalyst or solids hold up in vessel 10, it would be necessary to build a taller vessel to provide more height in the dilute phase for the return pipe 52.

With the present invention it is not necessary to provide extra vessel length and actually smaller or shorter vessels can be used. The separated solids from return pipe 52 are aerated in aeration pot 54 and passed to dilute phase riser 58 where the density of the upflowing column is adjusted and reduced by the controlled addition of lift gas into the lower end of riser 58 through line 64. The more dense column in return pipe 52 builds up sufficient pressure to return the less dense material in riser 58 to fluid bed 12. The 180° bend top portion 62 on riser 58 causes the fines to flow down into fluid bed 12 rather than up into the dilute phase 16. While the level of the fluid bed 12 is shown at 14 above seal pot 42 and above the top of riser 58, the process will operate equally well if the level of the fluid bed is at a lower level as shown at 76, for example, below the level of seal pot 42 and below the top of riser 58.

If a tertiary stage of cyclone separators is used, the gasiform material leaving the secondary cyclone separation stage 48 passes through line 78 to the tertiary stage 74 for separation of additional solids which are fines having a particle size in the range of about 0 to 40 microns. The separated gasiform material which may be vaporous reaction products are removed from separator 74 through line 80 and further treated as desired to recover valuable products. Additional presure drop is encountered in passing through the separation stage 74 and also because of the fineness of the recovered solids, it is necessary to provide special means for returning the separated solids to fluid bed 12 as above described in connection with secondary cyclone separation stage 48.

Return pipe 82 from tertiary separation stage 74 is shown as extending outside of vessel 10 so that the length of the return pipe 82 is not limited by the length or height of vessel 10. If only two stages of solids separation are used, the return pipe 52 may be arranged outside vessel 10 like return pipe 82, if desired. Or both return pipes 52 and 82 may be arranged inside or outside the vessel 10.

Return pipe 82 extends down through the top of aeration pot 84 for a distance as shown by reference character 86. A baffle may be arranged below in pot 84 below the outlet of dipleg 82. There is also a riser 88 provided with an aeration control line 92 and a 180° bend 94 at the top of riser 88, the bend being arranged inside vessel 10 below the level 14 of the solids bed 12. An aeration line 96 is provided for introducing gas into the bottom of pot 84. The arrangement of the combination of elements associated with tertiary separation stage 74 is substantially the same as that associated with the secondary separation stage 48.

While the present invention can be used in various processes such as catalytic cracking, thermal cracking or coking in the presence of finely divided solids, adsorption processes, etc., because the lift pot insures flow of the fine catalyst around the bend, it is especially adapted for use in fluid hydroforming where the rate of circulation of catalyst is relatively low and the catalyst recovered in the secondary or tertiary cyclones is extremely fine. The lift pot being full of solids also provides necessary catalyst or solids hold up to insure stability. That is, if a transient presure fluctuation would occur, all the catalyst or solid in the lift pot below upper end 68 of line 64 (Fig. 2) and above the bottom of dipleg 52 would have to be forced up into the dipleg, such as 52, for example, and the level of catalyst in the dipleg would have to increase by a much greater figure than just the distance from upper end 68 of line 64 to the bottom 56 of dipleg 52 (in one case at least 40″) before vapor would reverse flow up the dipleg 52. The lift pots also make it possible to combine diplegs from one stage and use only one riser to minimize lift gas requirements without suffering loss of essential stability. That is, where more than one cyclone separator is used for any stage, such as the secondary or tertiary stage, the diplegs may discharge into a common pipe which would then extend into a lift pot such as 54.

Figure 3:
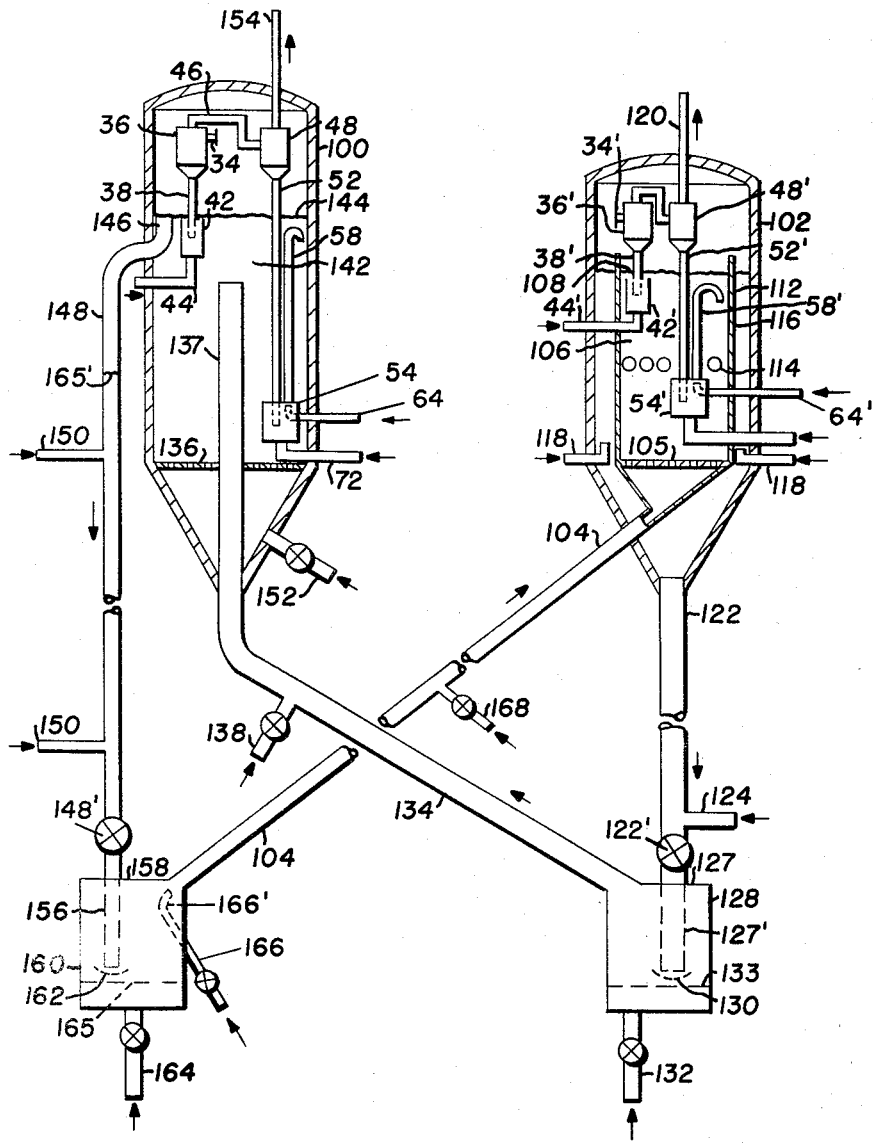
Fig. 3 represents a system in which the aerated pot and transfer lines are adapted for controlling flow of finely divided solids between the vessels.

Referring now to Fig. 3 there is shown a system for transferring solids between vessels where the flow of solids between the vessels is controlled by aerated pots rather than U-bends. Better control is obtained because the present invention provides means whereby flow of solids around bends or abrupt angles is provided. Also it is possible in some cases to lower the vessels because the aerated pots or transfer pots can be designed to provide the necessary seal between the vessels. Included in Fig. 3 are the seal pots for the primary cyclone separation stages and the aerated lift pots for the secondary cyclone separation stages in the two vessels described in greater detail in connection with Figs. 1 and 2. A tertiary separation stage may be used, if desired, but it is not shown. The same reference characters are applied to the seal pot and aerated pot and associated parts in vessel 100 in Fig. 3, as are used in Figs. 1 and 2, and the same reference characters primed are used for vessel 102 in Fig. 3 to show that the elements are the same but in different vessels.

The apparatus shown in Fig. 3 represents a fluid catalytic cracking unit and the invention will be described in connection therewith but it is to be expressly understood that the invention is not limited thereto. For example, the invention as shown in Fig. 3 is especially adapted for fluid hydroforming and may also be used in fluid coking. In Fig. 3 the reactor is designated 102 and the regenerator is designated 100. As a cracking catalyst finely divided synthetic silica-alumina may be used but other catalysts such as acid treated clays or Filtrol, silica-magnesia, silica-alumina-magnesia etc. may be used. The finely divided catalyst has particle sizes ranging from one micron to about 200 microns or more and of such size that 95% to substantially all the particles pass through 100 mesh.

The reactor is maintained at cracking temperature of about 850° F. to 950° F. and the catalyst to oil ratio passing through line 104 and through distribution grid 105 may vary between about 4 to 1 and 10 to 1. The catalyst is maintained as a dense fluid bed 106 having a level indicated at 108. The inner cylindrical shell 112 extends above the normal level of catalyst 108 and is provided with restriction orifices 114 to permit flow of catalyst to annular stripping section 116 into which stripping gas such as steam is introduced through line 118. The cracked vaporous products after passing through cyclone separators 36' and 48' are passed through line 120 to a fractionation system or the like to recover desired products.

The stripped catalyst particles from the stripping zone 116 pass or flow down into standpipe 122 wherein the particles are maintained in a fluidized condition by the introduction of aerating gas through one or more lines 124. The lower end 126 of standpipe 122 extends through the top 127 of and into aerating or lift pot 128 by extension 127' and empties into the pot 128. Extension 127' is preferably at least half the height of pot 128 and may be longer if desired. Standpipe 122 has a gas tight fit with top 127 of pot 128. Standpipe 122 contains the fluidized catalyst which builds up hydrostatic pressure for moving the catalyst to the regenerator presently to be described in greater detail. A safety shut off valve 122' is provided in the lower end of standpipe 122.

Arranged below the outlet end of standpipe 122 in aerating pot 128 is a baffle 130 which may be a horizontal flat baffle or a dished baffle to distribute the catalyst to the pot and to prevent aerating gas from line 132 from entering the standpipe. Aerating gas, such as steam, introduced through line 132 into the bottom of pot 128, passes through distribution grid 133 and maintains the catalyst particles in fluidized condition. The pot 128 is full of dense fluidized catalyst. Leading from the top of pot 128 is a riser 134 which conducts dense fluidized catalyst or solids from the pot 128 to the regenerator or heater 100 above the distribution grid 136 arranged in the bottom portion of regenerator 100. Riser 134 has an extension 137 above grid 136.

The bottom of riser 134 is flush with the top 127 of pot 128 and therefore is at a higher level than the bottom of standpipe 122 which extends into pot 128. Intermediate the ends of dense phase riser 134 is a line 138 for introducing gas for controlling the rate of circulation of solids in the system. By introducing more gas, such as air, through line 138, the column of fluidized solids in riser 134 above line 138 is made less dense and pressure developed by the solids in standpipe 122 forces the less dense suspension through riser 134 at a faster rate. Before any reversal of flow can occur in line 134, all the catalyst in pot 128 below extension 127' must be emptied out.

In the regenerator the catalyst or other solids are maintained as a dense turbulent fluidized bed 142 having a level indicated at 144. A top overflow well 146 is provided for removing catalyst or solids from bed 142 into standpipe 148 provided with aerating lines 150. Standpipe 148 has a safety shut off valve 148'. Extension 137 on riser 134 terminates in fluid bed 142 below the level of well 146. The major portion of the air or other regeneration or heating gas is introduced into regenerator 100 below grid 136 through line 152. The gases leaving bed 142 after passing through cyclone separators 36 and 48 are passed through line 154 to the atmosphere.

If the catalyst is one being regenerated after a cracking operation the temperature will be about 1000 to 1200° F. The superficial velocity of the gas passing upwardly through bed 142 is between about 1 and 3 ft./sec. and the density of the dense fluidized mixture of bed 142 is between about 25 and 35 lbs./cu. ft. when using finely divided silica-alumina catalyst of which about 95–100% passes through 100 mesh. In a fluid coking operation part of the coke will be burned in heater 100 and the coke particles may be heated to a temperature between about 1000 and 1600° F. and some of the coke particles will be removed from the process as product coke and some returned after grinding to make seed coke. In fluid coking, the coke particles are usually of a larger size up to 500 microns or larger and the present invention is also useful for this process.

The density of the fluidized mixture when using the silica-alumina catalyst in standpipes 122 and 148 is between about 30 and 40 lbs./cu. ft.

The lower end 156 of standpipe 148 extends through top 158 of aerating or lift pot 160 and into the pot 160 for some distance. Lower end 156 is preferably at least half the height of lift pot 158 and may be longer, if desired. The standpipe 148 and the top 158 of seal pot 160 are in gas tight relation. Arranged below the bottom outlet end 156 of standpipe 148 is a flat horizontal or dished horizontal baffle 162 to distribute solids from standpipe 148 to the pot 160 and to prevent aerating gas from line 164 from passing up standpipe 148. The aerating gas from line 164 is introduced into the bottom of pot 160 below distribution grid 165 and maintains the particles in a dense fluidized condition in pot 160. Baffles 130 and 162 need only be provided if difficulty with aeration gas flowing up the standpipe is encountered.

Lift pot 160 is full of dense fluidized catalyst or solid. The upper end or top 158 is provided with the dense phase riser 104 above mentioned which conducts regenerated catalyst or heated solids to reactor 102. The bottom open end of riser 104 is flush with the top 158 of pot 160 and so is at a higher elevation or plane than the bottom or lower portion 156 of standpipe 148. Adjacent the bottom open end of riser 104 and opening into the upper portion of the pot 160 is line 166 for introducing preheated hydrocarbons as liquid vapor mixtures or as a vapor into the pot 160 near riser 104. Line 166 extends through the side wall and into pot 160 and has an inner extension 166' bent at an angle to direct the flow of oil feed or other gasiform material into riser 104. The aerated transfer pot provides the necessary seal even with the oil feed being introduced through line 166 because in order for hydrocarbon vapor to reverse flow into the regenerator 100 via standpipe 150, the level of catalyst in the liftpot 160 must be depressed to the level of bottom of standpipe extension 156. The catalyst thus displaced will raise the level 165' of catalyst in the standpipe 156 and thus increase the deviation in differential pressure between vessels required to cause a flow reversal. This seal is usually obtained by injecting hydrocarbon feed partway up the riser 104 as at 168. Thus, replacement of present U-bends with lift pots of the present invention makes it possible to lower the vessels by about 5–10' without suffering loss of essential seal.

If desired, part of the oil feed may be added through line 166 and the rest of the oil added through line 168 located higher up and intermediate the ends of riser 104. Or all the oil feed may be added through line 166 and a gas such as steam may be introduced through line 168.

A nearly vertical riser (134, 104) is preferred but the slope of the risers can be varied as needed by mechanical design or catalyst flow characteristics.

For a catalytic cracking unit of about 11,000 barrels of total feed per day and wherein about 600 tons per hour of catalyst are circulated, the standpipes 122 and 148 will have a diameter of about 19 inches; riser 134 below air inlet 138 will have a diameter of about 19 inches and above air inlet 138 about 30". Riser 104 will have a diameter of about 24". Pot 128 will have a diameter of about 4' and a height of about 4–8'. The lower end 127' of standpipe 122 will extend to within about 2 feet of the grid 133 in the bottom of pot 128. Pot 160 will have a diameter of about 4' and a height of about 8'. The lower end 156 of standpipe 148 will extend about 6' below the top 158 of pot 160.

Referring again to Figs. 1 and 2 and with a reactor having a straight side dimension of about 60' the dipleg 52 will be about 51' long and for a hydroformer unit feeding 11,000 barrels of total oil feed to the reactor and circulating about 120 tons of catalyst per hour, the dipleg 52 will be about 6" in diameter. The lift pot 54 will be about 4½' high to the bottom of conical portion 66, conical portion being about 6" long on a vertical line. The pot 54 is about 12" in diameter. The riser 58 will be about 40' long and about 2" in diameter. The extension 56 on dipleg 52 extends into lift pot 54 for about 1' so that in cases where the invention is used with diplegs associated with cyclone separators the dipleg will extend into the lift pot at least about one quarter the depth of the lift pot.

The dipleg 82 associated with the tertiary cyclone separator 74 is about the same length as dipleg 52 if it is located inside vessel 10 but as shown in Fig. 1, dipleg 82 can be longer to build up sufficient pressure for the finer catalyst separated in the tertiary separation stage.

The density of the aerated or fluidized catalyst in dipleg 52 will be in the range of about 12–25 lbs./cu. ft., while the density of the mixture or suspension in riser 58 after the addition of lift gas at 64 will be in the range of about 0.2 to 5 lbs./cu. ft. so that the cyclone separators can be located closer to the surface 14 of the catalyst bed 12 in vessel 10 without loss of seal and consequent reverse flow of vapor up through the cyclone dipleg 52.

The lift pot of the type shown in Fig. 1 is especially adapted for use in hydroforming where pressures are high, the catalyst is exceedingly fine and catalyst flow rates are very low as compared to fluid catalytic cracking. Fine catalyst flows with difficulty around bends, particularly at low flow rates. The lift pot insures catalyst flow none the less. At higher pressures, pressure fluctuations of a greater magnitude are experienced than at low pressures. The lift pot provides the stability required to insure trouble-free operation. With this lift pot more than one cyclone separator may be in one stage and the diplegs therefrom are connected to only one riser.

As above pointed out the invention is adapted for use in fluid coking operations where larger contact particles up to 500 microns or larger are used. The relatively large contact or coke particles do not fluidize as easily as smaller particles and also such larger particles flow around a bend with difficulty. By providing an aerated or fluidized bed in the lift pot in which the larger or coarse coke or other particles can make the bend or turn, the present invention makes possible the controlled flow of coke particles or other coarse particles from one vessel to another.

What is claimed is:

1. In combination, a vessel adapted to contain fluidized solids and provided with an inlet and an outlet for gasiform material, a cyclone separator in the upper portion of said vessel for separating entrained solids from outgoing gasiform material, means for returning separated solids from said cyclone separator to said vessel, said means including a dipleg extending down from said cyclone separator to near the bottom of the vessel, a lift pot associated with the lower end of said dipleg, a riser connected with the top of said lift pot and extending to an upper portion of said vessel and means for introducing gas into the lower portion of said riser to move solids to an upper portion of said vessel.

2. The combination defined in claim 1 wherein the lower end of said dipleg extends into said lift pot and is at a lower level than the lower end of said riser.

3. The combination defined in claim 2 wherein the lower end of said dipleg extends for at least half of the depth of said lift pot.

4. The combination defined in claim 2 wherein means are included for introducing fluidizing gas into said lift pot.

5. An apparatus of the character described including a vessel for containing finely-divided solids, a standpipe having an upper end extending into said vessel and extending downwardly therefrom for withdrawing solids from said vessel, a lift pot, said standpipe having its lower end extending through the wall of said lift pot but terminating a distance above the bottom of said lift pot, means for introducing fluidizing gas into the bottom of said lift pot to maintain solids therein in a dense, fluidized condition, a riser extending upwardly from the top portion only of said lift pot, means for introducing lift fluid directly into the lower end of said riser for flow upwardly in said riser and for controlling the rate of flow of solids upwardly through said riser, said riser being adapted to conduct solids from said lift pot to a higher level and to another vessel.

6. An apparatus according to claim 5 wherein said means for introducing fluidizing gas into the bottom of said lift pot includes a horizontally arranged perforated grid member.

7. A method for controlling the circulation of fluidized solids between two contacting zones, which comprises maintaining a dense fluidized bed of solids in each of said zones, withdrawing solids from one of said zones as a dense fluidized column to produce hydrostatic pressure at its lower end, discharging solids from the bottom of said column into a sealing zone and maintaining the solids in said sealing zone in a dense fluidized condition and maintaining the sealing zone substantially full of fluidized solids, withdrawing fluidized solids as a confined stream from the top portion of said sealing zone at a level above the level of discharge of solids from said column and passing the withdrawn solids to the other of said zones, reducing the density of the fluidized mixture in said confined stream to control the rate of circulation between said zones and returning solids from the other of said zones to said first mentioned zone from which the solids are withdrawn as a dense fluidized column.

8. An apparatus for handling finely divided solid materials, comprising a vessel adapted to contain a first fluidized dense bed of said solid materials so as to expose an upper surface thereof within said vessel, separating means including a cyclone separator in the upper portion of said vessel for separating entrained solids from outgoing gasiform material, means for returning separated solids from said cyclone separator to said vessel, said means including a dipleg extending down from said cyclone separator to near the bottom of said vessel, an enclosed lift pot having top and bottom wall portions, said lift pot adapted to contain and to be substantially completely filled by a second fluidized dense bed of said solid materials, said dipleg having a lower end extended through said lift pot top wall portion to terminate intermediate said top and bottom wall portions, means for introducing a fluidizing gas into the bottom portion of said lift pot below the lower end of said dipleg whereby to maintain said second bed of solid materials in a fluidized condition, a riser conduit having an inlet end opening from said lift pot through said top wall portion thereof above the lower end of said dipleg and a discharge end opening at a level above said lift pot, said riser conduit being adapted to convey solid materials from said lift pot to the upper portion of said vessel, and means for introducing a gas into said riser conduit inlet end whereby to control the rate of flow of solids through said riser conduit.

9. An apparatus according to claim 8 wherein said separating means includes a series of cyclone separators connected in series flow relation and the later stages of said cyclone separators each having a dipleg and a lift pot.

References Cited in the file of this patent

UNITED STATES PATENTS

| | | |
|---|---|---|
| 2,423,850 | Peery | July 15, 1947 |
| 2,576,504 | England | Nov. 27, 1951 |
| 2,587,670 | Weinrich | Mar. 4, 1952 |
| 2,615,785 | Jewell | Oct. 28, 1952 |
| 2,640,731 | Hill | June 2, 1953 |
| 2,684,931 | Berg | July 27, 1954 |
| 2,715,048 | Kollgaard | Aug. 9, 1955 |
| 2,726,136 | Davis | Dec. 6, 1955 |